United States Patent
Kim et al.

(10) Patent No.: US 10,035,130 B2
(45) Date of Patent: Jul. 31, 2018

(54) METHOD FOR PREPARING SUPERABSORBENT POLYMER TREATED WITH WATER DISPERSION SOLUTION CONTAINING MICROPARTICLES

(71) Applicant: LG Chem, Ltd., Seoul (KR)

(72) Inventors: Su-Jin Kim, Daejeon (KR);
Young-Sam Kim, Daejeon (KR);
Young-In Yang, Daejeon (KR);
Kyoung-Shil Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/309,974

(22) PCT Filed: Oct. 14, 2015

(86) PCT No.: PCT/KR2015/010866
§ 371 (c)(1),
(2) Date: Nov. 9, 2016

(87) PCT Pub. No.: WO2016/111446
PCT Pub. Date: Jul. 14, 2016

(65) Prior Publication Data
US 2017/0266641 A1    Sep. 21, 2017

(30) Foreign Application Priority Data

Jan. 5, 2015  (KR) .................. 10-2015-0000449

(51) Int. Cl.
| | | |
|---|---|---|
| *B01J 20/26* | (2006.01) | |
| *B01J 20/28* | (2006.01) | |
| *B01J 20/30* | (2006.01) | |
| *C08F 220/04* | (2006.01) | |
| *C08J 3/24* | (2006.01) | |
| *C08K 3/36* | (2006.01) | |

(52) U.S. Cl.
CPC ........... *B01J 20/267* (2013.01); *B01J 20/261* (2013.01); *B01J 20/28016* (2013.01); *B01J 20/28047* (2013.01); *B01J 20/3021* (2013.01); *B01J 20/3085* (2013.01); *C08F 220/04* (2013.01); *C08J 3/245* (2013.01); *C08K 3/36* (2013.01); *C08J 2333/02* (2013.01)

(58) Field of Classification Search
CPC ........ B01J 20/26; B01J 20/267; B01J 20/261; C08F 220/04; C08J 3/245; C08K 3/36
USPC ........................................................ 502/402
See application file for complete search history.

(56) References Cited

U.S. PATENT DOCUMENTS

| | | |
|---|---|---|
| 2004/0024104 A1 | 2/2004 | Ota et al. |
| 2005/0113252 A1 | 5/2005 | Miyake et al. |
| 2005/0245393 A1 | 11/2005 | Herfert et al. |
| 2016/0214082 A1 | 7/2016 | Lee et al. |
| 2017/0137581 A1 | 5/2017 | Park et al. |
| 2017/0165637 A1 | 6/2017 | Park et al. |
| 2017/0173563 A1 | 6/2017 | Kim et al. |
| 2017/0233534 A1 | 8/2017 | Kim et al. |

FOREIGN PATENT DOCUMENTS

| | | |
|---|---|---|
| EP | 3078678 A1 | 10/2016 |
| EP | 3165564 A1 | 5/2017 |
| EP | 3239102 A1 | 11/2017 |
| JP | S56133028 A | 10/1981 |
| JP | H08253597 A | 10/1996 |
| JP | H09194598 A | 7/1997 |
| JP | 2005097604 A | 4/2005 |
| JP | 2005186016 A | 7/2005 |
| KR | 20050036975 A | 4/2005 |
| KR | 20120081113 A | 7/2012 |
| KR | 101507287 B1 | 3/2015 |
| KR | 20150064700 A | 6/2015 |
| WO | 0205949 A1 | 1/2002 |
| WO | 2013087926 A1 | 6/2013 |
| WO | 2016175427 A1 | 11/2016 |
| WO | 2016175428 A1 | 11/2016 |
| WO | 2016200010 A1 | 12/2016 |
| WO | 2017010660 A1 | 1/2017 |

OTHER PUBLICATIONS

International Search Report from PCT/KR2015/010866, dated Feb. 3, 2016.
Dow Corning "Dow Corning VM-2270 Aerogel Fine Particulars", Internet Citation, Apr. 2009, URL: http://www2.dowcorning.com/DataFiles/090007G88020e235.pdf, XP-002650585.
Extended European Search Report for Application No. EP15877166.7 dated Dec. 1, 2017.

*Primary Examiner* — Edward M Johnson
(74) *Attorney, Agent, or Firm* — Lerner, David, Littenberg, Krumholz & Mentlik, LLP (57) ABSTRACT

The present invention provides a method of preparing a superabsorbent polymer, including adding a superabsorbent polymer with a water dispersion solution containing particles having i) a BET specific surface area of 300 to 1500 m²/g and ii) a porosity of 50% or more, and a superabsorbent polymer prepared by the method.

19 Claims, 2 Drawing Sheets

METHOD FOR PREPARING SUPERABSORBENT POLYMER TREATED WITH WATER DISPERSION SOLUTION CONTAINING MICROPARTICLES

CROSS-REFERENCE TO RELATED APPLICATIONS

This application is a national phase entry under 35 U.S.C. § 371 of International Application No. PCT/KR2015/010866, filed Oct. 14, 2015, which claims priority to Korean Patent Application No. KR 10-2015-0000449, filed Jan. 5, 2015, the disclosures of which are incorporated herein by reference.

TECHNICAL FIELD

The present invention relates to a method of preparing a superabsorbent polymer and a superabsorbent polymer prepared thereby and, more particularly, to a method of preparing a superabsorbent polymer, which includes adding a water dispersion solution containing particles having specific properties, and a superabsorbent polymer prepared thereby.

BACKGROUND ART

Superabsorbent polymers (SAPs) are synthetic polymers that are able to absorb about 500 to 1000 times their own weight in water. Such superabsorbent polymers have begun to be used in real-world applications for sanitary items, and are currently being widely utilized not only in hygiene products, such as disposable baby diapers and the like, but also in gardening soil repair agents, water stop materials for civil construction, seeding sheets, freshness retaining agents in the field of food distribution, and fomentation materials.

In the preparation of the superabsorbent polymer, water, which is a polymerization medium, is used in various applications, including facilitating the dispersion of the crosslinking solution during the surface crosslinking process, etc. Also, residual moisture in the final product functions as an anti-static agent and a plasticizer for resin, and plays a role in suppressing the generation of very small superabsorbent polymer dust in the course of application and also preventing the grinding of the superabsorbent polymer particles. Generally, however, when water is added to the superabsorbent polymer, the surface stickiness of the polymer may be increased by the water absorbed thereto, and irreversible agglomeration of the superabsorbent polymer particles may take place. This increase in stickiness and agglomeration may result in poor processability, imposing a burden on the preparation and application processes, consequently increasing the particle size of the superabsorbent polymer, deteriorating the properties thereof, and decreasing productivity.

In this regard, Korean Patent Application Publication No. 2012-0081113 discloses a method of preparing an absorbent polymer containing water-insoluble inorganic particles. However, this conventional technique is problematic because the surface stickiness of the superabsorbent polymer increases with an increase in moisture content on the surface thereof, undesirably incurring agglomeration, poor processability, and low productivity, as mentioned above. Hence, there is required to develop superabsorbent polymers, which may satisfy both high moisture content and high processability.

In order to satisfy both high moisture content and high processability, porous superhydrophobic particles in ultrafine powder form may be used. Porous superhydrophobic particles in powder form have a very low bulk density of about 0.04 to 0.10 g/cm$^3$, and thus the volume relative to the weight thereof is quite large, undesirably increasing transport costs and the space necessary for storage. Furthermore, it is not easy to add such particles in fixed amounts upon mass production and the likelihood of scattering the particles in the air is high, undesirably deteriorating workability and endangering the health of workers.

Accordingly, there is a need for superabsorbent polymers containing microparticles that have both high moisture content and high processability and are available in a liquid phase so as to facilitate the handling thereof, thereby increasing economic efficiency and workability.

DISCLOSURE

Technical Problem

The present invention has been made keeping in mind the above problems encountered in the related art, and an object of the present invention is to provide a method of preparing a superabsorbent polymer, which includes adding a water dispersion solution containing microparticles having high transportability, storage capability and workability, in order to produce a superabsorbent polymer that satisfies both high moisture content and high processability, and a superabsorbent polymer having improved properties prepared thereby.

Technical Solution

In order to accomplish the above object, the present invention provides a method of preparing a superabsorbent polymer, comprising adding a hydrous gel polymer, produced by polymerizing a monomer composition comprising a water-soluble ethylenic unsaturated monomer and a polymerization initiator, with a water dispersion solution containing particles having i) a BET specific surface area of 300 to 1500 m$^2$/g and ii) a porosity of 50% or more.

In addition, the present invention provides a superabsorbent polymer, prepared by the above method.

Advantageous Effects

According to the present invention, the method of preparing a superabsorbent polymer includes adding a water dispersion solution containing microparticles to the superabsorbent polymer, thus obtaining the advantages of the use of microparticles, such as high moisture content, high processability, attrition resistance, and anti-caking properties, and overcoming the drawbacks of the use of microparticles, namely difficulty in storage and transport, high scattering properties, and poor workability.

BEST MODE

The present invention addresses a method of preparing a superabsorbent polymer. The method of preparing a superabsorbent polymer according to the present invention enables the production of a superabsorbent polymer having high moisture content, high processability, and attrition resistance, using a water dispersion solution containing microparticles, which are easy to store and transport and have good workability.

Hereinafter, a detailed description will be given of the present invention.

The method of preparing the superabsorbent polymer according to the present invention comprises adding a hydrous gel polymer, produced by polymerizing a monomer composition comprising a water-soluble ethylenic unsaturated monomer and a polymerization initiator, with a water dispersion solution containing particles. The particles have either i) a BET specific surface area of 300 to 1500 m$^2$/g or ii) a porosity of 50% or more.

As used herein, the term "particles" may refer to porous or superhydrophobic microparticles, and may be taken to have the same meaning as "microparticles".

In an embodiment of the present invention, the particles preferably have a particle size ranging from 2 nm to 50 μm, or have superhydrophobicity with a water contact angle of 125° or more. More preferably, the particles have both the particle size and the contact angle in the ranges as described above, but the present invention is not limited thereto.

In an embodiment of the present invention, the water dispersion solution may comprise the particles, water, and an organic solvent, and the organic solvent may be at least one selected from the group consisting of methanol, ethanol, isopropyl alcohol (IPA), and acetone. Particularly useful is isopropyl alcohol (IPA).

Typically, a superabsorbent polymer has a hydrophilic surface, and irreversible agglomeration thereof may occur due to capillary force, hydrogen bonding, or inter-particular van der Waals force, attributable to water present between the particles upon drying after water absorption. Hence, water is essentially used in the course of polymerization and surface crosslinking of the superabsorbent polymer, and thereby agglomeration occurs, thus increasing internal load, ultimately incurring damage to the system. Furthermore, since the agglomerated superabsorbent polymer has a large particle size, which is unsuitable for use in practice, a disintegration process has to be implemented so that the large particle size is suitably decreased. Also, strong force is applied during the disintegration process, undesirably deteriorating the properties of the superabsorbent polymer, attributable to attrition.

In order to solve these problems, attempts have been made to introduce a variety of microparticles, which function to prevent direct agglomeration of the polymer particles, to the surface of the superabsorbent polymer. In the case where the microparticles are added in an excessive amount, agglomeration may be prevented, but the absorption performance of the superabsorbent polymer may decrease.

To solve such problems, the microparticles introduced to the superabsorbent polymer according to the present invention have a particle size ranging from 2 nm to 50 μm. Also, the microparticles have a BET specific surface area of 300 to 1500 m$^2$/g, preferably 500 to 1500 m$^2$/g, and more preferably 700 to 1500 m$^2$/g. The microparticles have superhydrophobicity with a water contact angle of 125° or more, preferably 140° or more, and more preferably 145° or more. Furthermore, the microparticles have a porosity of 50% or more, and preferably 90% or more. In the method of preparing the superabsorbent polymer according to the present invention, the use of the microparticles as described above may decrease the effect of water present on the surface of the polymer, and furthermore, may remarkably reduce agglomeration. Even when a relatively small amount of particles is used, permeability may be easily increased, and high water content and maintenance thereof may be readily ensured.

In the present invention, the material for particles is not limited so long as it has the above i) and ii) properties, and examples thereof may include, but are not limited to, inorganic oxides, such as silica ($SiO_2$), alumina, carbon, and titania ($TiO_2$), inorganic compounds, organic polymers, ion exchange resins, metals, metal salts, etc. Preferably useful is silica ($SiO_2$).

The particles are used in an amount of 1 to 25 parts by weight based on 100 parts by weight of the mixture comprising water and organic solvent. When the amount of the particles falls in the above range, dispersion is efficiently carried out, and there is no gelling due to unstable dispersion upon long-term storage. Hence, an adjuvant for preventing the gelling, such as an additive, a pH controller, a surfactant, or a stabilizer, need not be used, and thus the inherent superhydrophobic and porous properties of the particles may be maintained in the drying process. Accordingly, there is no need to remove the adjuvant through pre-treatment, and the particles may be directly fed to the process.

After the addition of the water dispersion solution, the mixing is preferably performed at a rate of 200 to 3000 rpm. If the mixing rate is less than 200 rpm, a sufficient mixing effect cannot be obtained. In contrast, if the mixing rate exceeds 3000 rpm, excessive grinding may occur.

After the addition of the water dispersion solution containing the particles to the hydrous gel polymer, the mixing is preferably performed for a period of time ranging from 10 sec to 3 min. If the mixing time is less than 10 sec, a sufficient mixing effect cannot be obtained. On the other hand, if the mixing time exceeds 3 min, excessive grinding may occur.

The method of preparing the superabsorbent polymer according to the present invention includes polymerizing the monomer composition comprising the water-soluble ethylenic unsaturated monomer and the polymerization initiator, thus preparing the hydrous gel polymer.

In the preparation of the superabsorbent polymer according to the present invention, the above polymer may be prepared by steps and methods typically used in the art. Specifically, upon preparation of the superabsorbent polymer according to the present invention, the monomer composition includes a polymerization initiator. Depending on the polymerization method, when photopolymerization is performed, a photopolymerization initiator is used, and when thermal polymerization is performed, a thermal polymerization initiator is employed. Even when the photopolymerization is conducted, a predetermined amount of heat is generated due to irradiation with UV light and also through the polymerization, which is an exothermic reaction, and thus a thermal polymerization initiator may be additionally used.

In the method of preparing the superabsorbent polymer according to the present invention, the thermal polymerization initiator is not particularly limited, but preferably includes at least one selected from the group consisting of a persulfate-based initiator, an azo-based initiator, hydrogen peroxide, and ascorbic acid. Specifically, examples of the persulfate-based initiator may include sodium persulfate ($Na_2S_2O_8$), potassium persulfate ($K_2S_2O_8$), and ammonium persulfate (($NH_4)_2S_2O_8$), and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, and 4,4-azobis-(4-cyanovaleric acid).

In the method of preparing the superabsorbent polymer according to the present invention, the photopolymerization initiator is not particularly limited, but preferably includes at least one selected from the group consisting of benzoin ether, dialkyl acetophenone, hydroxyl alkyl ketone, phenyl glyoxylate, benzyl dimethyl ketal, acyl phosphine, and α-aminoketone. Specific examples of acyl phosphine may include commercially available Lucirin TPO, namely 2,4,6-trimethyl-benzoyl-trimethyl phosphine oxide.

In the method of preparing the superabsorbent polymer according to the present invention, the water-soluble ethylenic unsaturated monomer is not particularly limited, so long as it is a monomer typically used to synthesize a superabsorbent polymer, and preferably includes any one or more selected from the group consisting of an anionic monomer and salts thereof, a nonionic hydrophilic monomer, and an amino group-containing unsaturated monomer and quaternary salts thereof. Particularly useful is at least one selected from the group consisting of anionic monomers and salts thereof, such as acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid, and 2-(meth)acrylamide-2-methylpropane sulfonic acid; nonionic hydrophilic monomers, such as (meth)acrylamide, N-substituted (meth)acrylate, 2-hydroxyethyl(meth)acrylate, 2-hydroxypropyl(meth)acrylate, methoxypolyethyleneglycol (meth)acrylate, and polyethyleneglycol (meth)acrylate; and amino group-containing unsaturated monomers and quaternary salts thereof, such as (N,N)-dimethylaminoethyl (meth)acrylate, and (N,N)-dimethylaminopropyl (meth)acrylamide. More preferably, acrylic acid or salts thereof are used. When acrylic acid or salts thereof are used as the monomer, a superabsorbent polymer having high absorbability may be advantageously obtained.

In the method of preparing the superabsorbent polymer according to the present invention, the monomer composition may include a predetermined amount of a polymer or resin powder having a particle size of less than 150 μm, corresponding to dust of the prepared superabsorbent polymer powder, in order to attain the effect of recycling. Specifically, the polymer or resin powder having a particle size of less than 150 μm may be added before the initiation of the polymerization of the monomer composition, or in the early, middle or late stages, after the initiation of polymerization. As such, the amount thereof that is added is not limited, but is preferably set to 1 to 10 parts by weight based on 100 parts by weight of the monomer contained in the monomer composition, in order to prevent the properties of the final superabsorbent polymer from deteriorating.

In the method of preparing the superabsorbent polymer according to the present invention, the concentration of the water-soluble ethylenic unsaturated monomer of the monomer composition may be appropriately determined in consideration of the polymerization time and the reaction conditions, and is preferably set to 40 to 55 wt %. If the concentration of the water-soluble ethylenic unsaturated monomer is less than 40 wt %, economic benefits are negated. In contrast, if the concentration thereof exceeds 55 wt %, the grinding efficiency of the hydrous gel polymer may decrease.

Whether the hydrous gel polymer is prepared from the monomer composition using thermal polymerization or photopolymerization is not limited, so long as it is typically useful. Specifically, polymerization methods are largely classified into thermal polymerization and photopolymerization, depending on the polymerization energy source. Typically, thermal polymerization is conducted using a reactor with a stirring shaft, such as a kneader, and photopolymerization is implemented using a reactor with a movable conveyor belt. However, the above polymerization methods are merely illustrative, and the present invention is not limited to those polymerization methods.

For example, hot air is fed to a reactor with a stirring shaft, such as a kneader, or the reactor is heated, so that thermal polymerization is carried out, yielding a hydrous gel polymer, which is then discharged at a size ranging from ones of mm to ones of cm through the outlet of the reactor, depending on the shape of the stirring shaft of the reactor. Specifically, the size of the hydrous gel polymer may vary depending on the concentration of the supplied monomer composition and the supply rate thereof, and typically a hydrous gel polymer having a particle size of 2 to 50 mm may be obtained.

Also, when photopolymerization is carried out using a reactor with a movable conveyor belt, a hydrous gel polymer in a sheet form having the width of the belt may result. As such, the thickness of the polymer sheet may vary depending on the concentration of the supplied monomer composition and the supply rate thereof, but the monomer composition is preferably supplied so as to form a polymer sheet having a thickness of 0.5 to 5 cm. In the case where the monomer composition is supplied to the extent that a very thin polymer sheet is formed, production efficiency may undesirably decrease. If the thickness of the polymer sheet is greater than 5 cm, polymerization may not be uniformly carried out throughout the sheet, which is too thick.

The hydrous gel polymer thus obtained typically has a moisture content ranging from 30 to 60 wt %. As used herein, the term "moisture content" refers to the amount of moisture based on the total weight of the hydrous gel polymer, that is, a value obtained by subtracting the weight of the dried polymer from the weight of the hydrous gel polymer. (Specifically, it is defined as a value calculated by measuring the weight reduction due to the evaporation of moisture from the polymer while the polymer is dried at a high temperature via IR heating. As such, the drying is performed in such a manner that the temperature is increased from room temperature to 180° C. and then maintained at 180° C., and the total drying time is set to 20 min, including 5 min necessary for increasing the temperature.)

The hydrous gel polymer, obtained through the thermal polymerization or photopolymerization, is dried, and is preferably dried at a drying temperature ranging from 150 to 250° C. As used herein, the term "drying temperature" refers to the temperature of the heat medium used for the drying process or the temperature of the drying reactor, including the heat medium and the polymer, in the drying process.

If the drying temperature is lower than 150° C., the drying time may become excessively long, and the properties of the final superabsorbent polymer may deteriorate. In contrast, if the drying temperature is higher than 250° C., only the surface of the polymer may be excessively dried, and thereby dust may be generated in the subsequent grinding process, and the properties of the final superabsorbent polymer may deteriorate. The drying is preferably performed at a temperature of 150 to 250° C., and more preferably 160 to 200° C.

The drying time is not limited, but may be set to 20 to 90 min taking into account the processing efficiency.

Additionally, the drying process is not limited so long as it is typically used to dry the hydrous gel polymer. Specific examples thereof may include the supply of hot air, IR irradiation, microwave irradiation, and UV irradiation. The polymer after the drying process may have a moisture content of 0.1 to 10 wt %.

Meanwhile, the method of preparing the superabsorbent polymer according to the present invention may further comprise a simple grinding process before the drying process, as necessary, in order to increase the drying efficiency. The simple grinding process before the drying process is conducted so that the particle size of the hydrous gel polymer ranges from 1 to 15 mm. Grinding the polymer until the particle size is less than 1 mm is technically difficult due to the high moisture content of the hydrous gel polymer, and furthermore, the ground particles may agglomerate. In contrast, if the polymer is ground to a particle size larger than 15 mm, the effect of increasing the drying efficiency via the grinding process may become insignificant.

In the simple grinding process before the drying process, any grinder may be used without limitation. The specific example thereof may include, but is not limited to, any one selected from the group consisting of a vertical pulverizer, a turbo cutter, a turbo grinder, a rotary cutter mill, a cutter mill, a disc mill, a shred crusher, a crusher, a chopper, and a disc cutter.

When the grinding process is performed to increase the drying efficiency before the drying process in this way, the polymer, which has high moisture content, may stick to the surface of the grinder. Thus, in order to increase the grinding efficiency of the hydrous gel polymer before the drying process, an additive able to prevent stickiness upon grinding may be further used.

The specific kind of additive that may be found useful is not limited. Examples thereof may include, but are not limited to, a powder agglomeration inhibitor, such as steam, water, a surfactant, and inorganic powder such as clay or silica; a thermal polymerization initiator, such as a persulfate-based initiator, an azo-based initiator, hydrogen peroxide, and ascorbic acid; and a crosslinking agent, such as an epoxy-based crosslinking agent, a diol-based crosslinking agent, a bifunctional or trifunctional or higher polyfunctional acrylate, and a monofunctional compound having a hydroxyl group.

After the drying process in the method of preparing the superabsorbent polymer according to the present invention, the dried polymer is ground. Thereby, the resulting polymer has a particle size ranging from 150 to 850 μm.

In the method of preparing the superabsorbent polymer according to the present invention, the grinder used to obtain this particle size may include, but is not limited to, a pin mill, a hammer mill, a screw mill, a roll mill, a disc mill, or a jog mill.

In the method of preparing the superabsorbent polymer according to the present invention, the ground hydrous gel polymer is added with a surface crosslinking agent, so that a surface crosslinking reaction is carried out. The surface crosslinking reaction may be performed either before or after the water dispersion solution containing particles is added to the hydrous gel polymer.

In the method of preparing the superabsorbent polymer according to the present invention, the surface crosslinking agent is not limited, so long as it is able to react with the functional group of the polymer. In order to improve the properties of the superabsorbent polymer, the surface crosslinking agent may include at least one selected from the group consisting of a polyhydric alcohol compound, an epoxy compound, a polyamine compound, a haloepoxy compound, a haloepoxy compound condensed product, an oxazoline compound, a mono-, di- or poly-oxazolidinone compound, a cyclic urea compound, a polyhydric metal salt, and an alkylene carbonate compound.

Specifically, the polyhydric alcohol compound may include at least one selected from the group consisting of mono-, di-, tri-, tetra- or poly-ethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol.

Examples of the epoxy compound may include ethylene glycol diglycidyl ether and glycidol, and the polyamine compound may include at least one selected from the group consisting of ethylene diamine, diethylene triamine, triethylene tetramine, tetraethylene pentamine, pentaethylene hexamine, polyethyleneimine, and polyamide polyamine.

Examples of the haloepoxy compound may include epichlorohydrin, epibromohydrin, and α-methyl epichlorohydrin. The mono-, di- or poly-oxazolidinone compound may be exemplified by 2-oxazolidinone. The alkylene carbonate compound may include ethylene carbonate. These compounds may be used alone or in combination. To increase the efficiency of the surface crosslinking process, the surface crosslinking agent preferably includes at least one polyhydric alcohol compound, and more preferably includes a polyhydric alcohol compound having 2 to 10 carbon atoms.

The amount of the surface crosslinking agent added to treat the surface of the polymer particles may be appropriately determined depending on the kind of surface crosslinking agent or the reaction conditions, and is set to 0.001 to 5 parts by weight, preferably 0.01 to 3 parts by weight, and more preferably 0.05 to 2 parts by weight, based on 100 parts by weight of the polymer.

If the amount of the surface crosslinking agent is too small, the surface crosslinking reaction does not readily occur. In contrast, if the amount thereof exceeds 5 parts by weight based on 100 parts by weight of the polymer, the properties of the superabsorbent polymer may deteriorate due to excessive surface crosslinking reactions.

As such, adding the surface crosslinking agent to the polymer is not limited. Specifically, the surface crosslinking agent and the polymer powder may be placed in a reaction bath and mixed, the surface crosslinking agent may be sprayed onto the polymer powder, or the polymer and the crosslinking agent may be continuously supplied and mixed using a reaction bath such as a mixer that operates continuously.

The temperature of the polymer itself may be 20 to 90° C. when the surface crosslinking agent is added, so that the temperature is increased to the reaction temperature within 1 to 60 min to perform surface crosslinking in the presence of the surface crosslinking agent. To show the temperature of the polymer itself as above, processes after the drying process, which is carried out at relatively high temperature, are continuously performed, and the processing time may be shortened. Alternatively, the polymer may be heated separately when it is difficult to shorten the processing time.

In the method of preparing the superabsorbent polymer according to the present invention, the surface crosslinking agent that is added to the polymer may be heated in order to increase the temperature to the reaction temperature within 1 to 60 min to perform surface crosslinking in the presence of the surface crosslinking agent.

Meanwhile, in the method of preparing the superabsorbent polymer according to the present invention, when the surface crosslinking reaction is carried out after the temperature is increased to the reaction temperature within 1 to 60 min so as to prepare for surface crosslinking, the efficiency of the surface crosslinking process may be increased. Ultimately, the residual monomer content of the final superabsorbent polymer may be minimized, and a superabsorbent polymer having superior properties may be attained. As such, the temperature of the added surface crosslinking agent is adjusted within the range from 5 to 60° C., and preferably 10 to 40° C. If the temperature of the surface crosslinking agent is lower than 5° C., the effect of decreasing the rate of heating to the surface crosslinking reaction temperature by heating the surface crosslinking agent may become insignificant. On the other hand, if the temperature of the surface crosslinking agent is higher than 60° C., the surface crosslinking agent may not be uniformly dispersed in the polymer. As used herein, the surface crosslinking reaction temperature may be defined as the total temperature of the polymer and the surface crosslinking agent that is added for the crosslinking reaction.

The heating member for the surface crosslinking reaction is not limited. Specifically, a heat medium may be supplied, or direct heating may be conducted using electricity, but the present invention is not limited thereto. Specific examples of the heat source may include steam, electricity, UV light, and IR light. Additionally, a heated thermal fluid may be used.

In the method of preparing the superabsorbent polymer according to the present invention, after heating for the crosslinking reaction, the crosslinking reaction is carried out for a period ranging from 1 to 120 min, preferably 5 to 40 min, and more preferably 10 to 20 min. If the crosslinking reaction time is shorter than 1 min, the crosslinking reaction may not sufficiently occur. In contrast, if the crosslinking reaction time is longer than 60 min, the properties of the superabsorbent polymer may deteriorate due to the excessive surface crosslinking reaction, and the polymer may be subjected to attrition due to long-term residence in the reactor.

The superabsorbent polymer, produced by reacting the hydrous gel polymer with the surface crosslinking agent, may be additionally ground. The superabsorbent polymer thus ground has a particle size ranging from 150 to 850 μm. The grinder used to obtain this particle size may include, but is not limited to, a pin mill, a hammer mill, a screw mill, a roll mill, a disc mill, or a jog mill.

In addition, the present invention addresses a superabsorbent polymer prepared by the above preparation method.

Mode for Invention

A better understanding of the present invention may be obtained via the following non-limited examples, which are set forth to illustrate, but are not to be construed as limiting the scope of the present invention. The scope of the present invention is given by the claims, and also contains all modifications within the meaning and range equivalent to the claims. Unless otherwise mentioned, "%" and "part", indicating amounts in the following examples and comparative examples, are given on a mass basis.

EXAMPLES

Preparation Example

Preparation of Hydrous Gel Polymer 100 g of acrylic acid, 0.3 g of polyethyleneglycol diacrylate as a crosslinking agent, 0.033 g of diphenyl(2,4,6-trimethylbenzoyl)-phosphine oxide as an initiator, 38.9 g of sodium hydroxide (NaOH), and 103.9 g of water were mixed, thus preparing a monomer mixture. The monomer mixture was then placed on a continuously moving conveyor belt and irradiated with UV light (at 2 mW/cm$^2$) so that UV polymerization was carried out for 2 min, thus obtaining a hydrous gel polymer.

Preparation Example

Preparation of Superabsorbent Polymer

The hydrous gel polymer thus obtained was cut to a size of 5×5 mm, dried in a hot air oven at 170° C. for 2 hr, ground using a pin mill, and then sorted using a sieve, thereby obtaining a superabsorbent polymer having a particle size of 150 to 850 μm.

Thereafter, the superabsorbent polymer was surface-crosslinked using 3.5% ethyleneglycol diglycidyl ether, reacted at 120° C. for 1 hr, ground, and then sorted using a sieve, yielding a surface-treated superabsorbent polymer having a particle size of 150 to 850 μm.

EXAMPLES

Preparation of Superabsorbent Polymer Including Water Dispersion Solution Containing Microparticles Example 1

250 g of the superabsorbent polymer obtained in Preparation Example as described above was placed in a stirrer and stirred at 1000 rpm for 60 sec. Thereafter, the superabsorbent polymer was added with 7.075 g of a microparticle dispersion solution and then mixed for 60 sec. The resulting mixture was aged for 30 min and then sorted using a sieve, thus obtaining a superabsorbent polymer having a particle size of 150 to 850 μm.

The microparticle dispersion solution was prepared by mixing 1.5 g of a solution comprising superhydrophobic microparticulate silica Aerogel (AeroZel™, JIOS), isopropyl alcohol and water at a ratio of 1:4.5:4.5, with 5.545 g of water. As such, isopropyl alcohol, which is the organic solvent, was used as a dispersion aid to disperse the particles.

The silica Aerogel had a particle size of 30 nm, a BET specific surface area of 500 m$^2$/g, a water contact angle of 150°, and a porosity of 95%.

The particle size of the Aerogel was measured through Laser Diffraction using HELOS (Helium-Neon Laser Optical System) based on ISO 13320. The specific surface area thereof was measured using a BET meter (Micromeritics 3Flex). The porosity thereof was determined from the tap density ($\rho_t$) and the true density ($\rho_s$) of Equation 1 below.

$$\text{Porosity (\%)} = (1-\rho_t/\rho_s)*100 \qquad \text{[Equation 1]}$$

In order to measure the true density, a pycnometer (Accupyc II 1340) was used, and the tap density was measured using a volumeter (Engelsmann Model STAV II).

The water contact angle was measured using a contact angle analyzer (KRUSS DSA100), and was specifically determined in a manner in which double-sided tape was attached to a flat glass plate, microparticles were applied in a monolayer thereon, and then 5 μL of ultrapure water was placed in the form of drop on the monolayer, and the angle between the water drop and the glass plate was measured four times and averaged.

Example 2

A microparticle dispersion solution was prepared by mixing 2.5 g of a solution comprising microparticulate silica Aerogel (AeroZel™, JIOS), isopropyl alcohol and water at a ratio of 1:4.5:4.5, with 5.125 g of water, and then added in an amount of 7.625 g to a superabsorbent polymer.

The superabsorbent polymer was obtained in the same manner as in Example 1, with the exception that the amount of the microparticle dispersion solution was changed.

Example 3

A microparticle dispersion solution was prepared by mixing 2.5 g of a solution comprising superhydrophobic microparticulate silica Aerogel (AeroZel™, JIOS), isopropyl alcohol and water at a ratio of 1:4.5:4.5, with 11.375 g of water, and then added in an amount of 13.875 g to a superabsorbent polymer.

The superabsorbent polymer was obtained in the same manner as in Example 1, with the exception that the amount of the microparticle dispersion solution was changed.

Comparative Example 1

A superabsorbent polymer was obtained in the same manner (stirring for 120 sec without microparticles) as in Example 1, with the exception that the microparticle dispersion solution was not used.

Comparative Example 2

250 g of the superabsorbent polymer prepared in Preparation Example as described above and 0.15 g of microparticulate silica Aerogel (AeroZel™, JIOS) were placed in a stirrer and stirred at 1000 rpm for 60 sec. The stirred mixture was added with 6.25 g of water and further stirred for 60 sec. Thereafter, the resulting mixture was sorted using a sieve, yielding a superabsorbent polymer having a particle size of 150 to 850 μm.

Comparative Example 3

A superabsorbent polymer was obtained in the same manner as in Comparative Example 2, with the exception that 0.25 g of microparticulate silica Aerogel (AeroZel™, JIOS) was used.

Comparative Example 4

A superabsorbent polymer was obtained in the same manner as in Comparative Example 2, with the exception that 0.25 g of microparticulate silica Aerogel (AeroZel™, JIOS) and 12.5 g of water were used.

The features of preparation methods of Examples 1 to 3 and Comparative Examples 1 to 4 are summarized in Table 1 below.

TABLE 1

| | Form of added microparticles | Amount of microparticle dispersion solution (g) | Amount of microparticles (g) | Total amount of added water (g) |
|---|---|---|---|---|
| Ex. 1 | Dispersion solution | 7.075 | 0.15 | 6.25 |
| Ex. 2 | Dispersion solution | 7.625 | 0.25 | 6.25 |
| Ex. 3 | Dispersion solution | 13.875 | 0.25 | 12.5 |
| C. Ex. 1 | — | — | — | — |
| C. Ex. 2 | Powder | — | 0.15 | 6.25 |
| C. Ex. 3 | Powder | — | 0.25 | 6.25 |
| C. Ex. 4 | Powder | — | 0.25 | 12.5 |

TEST EXAMPLES

Evaluation of Properties

In order to evaluate the properties of the superabsorbent polymers of Examples 1 to 3 and Comparative Examples 1 to 4, the following tests were performed.

Before the following tests, the superabsorbent polymers of Examples 1 to 3 and Comparative Examples 1 to 4 were subjected to ball milling. 20 g of the superabsorbent polymer and ceramic balls having a diameter of 2.5 cm were placed in a 1 L ceramic bottle, and were then subjected to milling through rotating at 300 rpm for 15 min. Thereafter, the particle size was determined through the method of Test Example 4, and the superabsorbent polymers before and after ball milling were tested in Test Examples 1 to 3.

Test Example 1

Centrifugal Retention Capacity (CRC)

The superabsorbent polymers of Examples 1 to 3 and Comparative Examples 1 to 4 were measured for CRC before and after ball milling. Specifically, 0.2 g of a sample having a particle size of 300 to 600 μm, of the prepared superabsorbent polymer, was placed in a teabag and then immersed in a 0.9% saline solution for 30 min. Thereafter, dehydration was performed for 3 min by centrifugal force equivalent to 250 G (gravity), and the amount of absorbed saline solution was measured.

Test Example 2

Absorption Under Pressure (AUP)

The superabsorbent polymers of Examples 1 to 3 and Comparative Examples 1 to 4 were measured for AUP before and after ball milling. Specifically, 0.9 g of a sample having a particle size of 300 to 600 μm, of the prepared superabsorbent polymer, was placed in a cylinder according to the EDANA method, and a pressure of 0.7 psi was applied using a piston and a weight. Thereafter, the amount of 0.9% saline solution absorbed for 60 min was measured.

Test Example 3

Permeability

The superabsorbent polymers of Examples 1 to 3 and Comparative Examples 1 to 4 were measured for permeability before and after ball milling.

In order to prevent the generation of bubbles between a cock and a glass filter in the lower portion of a chromatography column, about 10 mL of water was added in the opposite direction into the column, and the column was washed two or three times with saline and then filled with at least 40 mL of 0.9% saline. A piston was placed in the chromatography column, the lower valve was opened, and the period of time (B: sec) required for the liquid surface to move from 40 mL to 20 mL was recorded, thus completing blank testing. 0.2 g of a sample having a particle size ranging from 300 to 600 μm, of the prepared superabsorbent polymer, was placed and then saline was added. The total amount of saline that resulted was 50 mL. The sample was allowed to stand for 30 min so that the superabsorbent polymer was sufficiently swollen. The piston (0.3 psi) with a weight was placed in the chromatography column and then allowed to stand for 1 min. The cock at the bottom of the chromatography column was opened, and the period of time (T1: sec) required for the liquid surface to move from 40 mL to 20 mL was recorded. The permeability was represented as follows.

Permeability=$T1-B$

Figure 2:
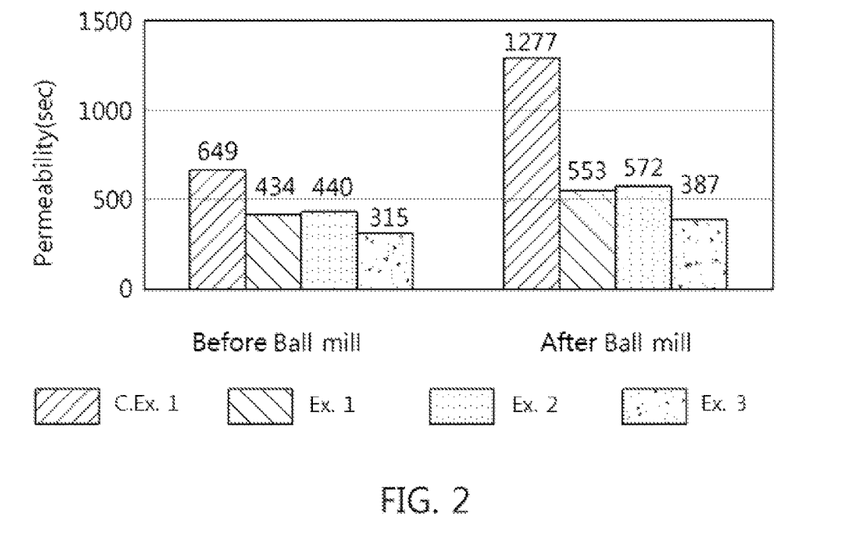
FIG. 2 illustrates the permeability of the superabsorbent polymers of Comparative Example 1 and Examples 1 to 3, both before and after ball milling.

The resultant permeabilities of the superabsorbent polymers of Examples 1 to 3 and Comparative Example 1 are shown in FIG. 2. The superabsorbent polymers of Examples 1 to 3 exhibited permeability superior to that of Comparative Example 1.

Test Example 4

Particle Size of Superabsorbent Polymer

The superabsorbent polymers of Examples 1 to 3 and Comparative Examples 1 to 4 were measured for particle size. The particle size of the superabsorbent polymer was measured using the EDANA method WSP 240.3. 100 g of the superabsorbent polymer was sorted at 850 μm, 600 μm, 300 μm, and 150 μm using a mesh from Pan, and vibrated for 10 min under conditions of an amplitude of 1.44 mm and a vibration frequency of 50 Hz, and the amount remaining on each sieve was determined.

Figure 1:
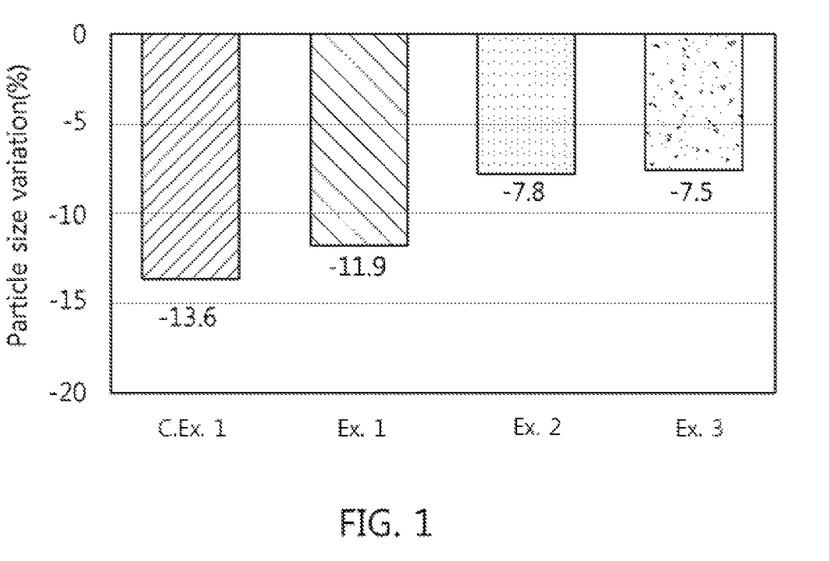
FIG. 1 illustrates the variation in particle size, ranging from 300 to 600 μm, after ball milling of the superabsorbent polymers of Comparative Example 1 and Examples 1 to 3.

The results of the particle size variations of the superabsorbent polymers of Examples 1 to 3 and Comparative Example 1 are shown in FIG. 1. The superabsorbent polymers of Examples 1 to 3 had low particle size variation after ball milling, compared to Comparative Example 1.

The results of measurement of CRC, AUP and permeability of the superabsorbent polymers of Examples 1 to 3 and Comparative Examples 1 to 4 before and after ball milling are shown in Table 2 below.

TABLE 2

|  | Ball milling | CRC (g/g) | AUP (g/g) | Permeability (sec) |
| --- | --- | --- | --- | --- |
| Ex. 1 | Before | 33 | 23 | 434 |
|  | After | 34 | 20 | 553 |
| Ex. 2 | Before | 33 | 23 | 440 |
|  | After | 34 | 22 | 572 |
| Ex. 3 | Before | 32 | 23 | 315 |
|  | After | 33 | 21 | 387 |
| C. Ex. 1 | Before | 34 | 25 | 649 |
|  | After | 35 | 22 | 1277 |
| C. Ex. 2 | Before | 35 | 22 | 373 |
|  | After | 35 | 22 | 585 |
| C. Ex. 3 | Before | 35 | 23 | 361 |
|  | After | 35 | 22 | 460 |
| C. Ex. 4 | Before | 34 | 23 | 228 |
|  | After | 34 | 20 | 299 |

The moisture content and the dust generation after ball milling of the superabsorbent polymers of Examples 1 to 3 and Comparative Examples 1 to 4 are shown in Table 3 below.

TABLE 3

|  | Moisture content (%) | Dust generation (%) after ball milling |
| --- | --- | --- |
| Ex. 1 | 2.7 | 11.9 |
| Ex. 2 | 2.5 | 7.8 |
| Ex. 3 | 4.4 | 7.5 |
| C. Ex. 1 | 0.6 | 13.6 |
| C. Ex. 2 | 2.6 | 8.4 |
| C. Ex. 3 | 2.6 | 7.1 |
| C. Ex. 4 | 4.6 | 6.7 |

The results of measurement of the particle size distribution of Test Example 4 are given in Table 4 below.

TABLE 4

|  | Particle size distribution | | | | |
| --- | --- | --- | --- | --- | --- |
|  | 150 μm or less | 150 to 300 μm | 300 to 600 μm | 600 to 850 μm | 850 μm or more |
| Ex. 1 | 1.69 | 24.22 | 42.70 | 31.30 | 0.09 |
| Ex. 2 | 1.19 | 17.58 | 43.85 | 37.34 | 0.04 |
| Ex. 3 | 1.27 | 19.86 | 43.02 | 35.74 | 0.11 |
| C. Ex. 1 | 2.4818 | 20.4425 | 41.3137 | 35.6723 | 0.0897 |
| C. Ex. 2 | 0.28 | 11.89 | 49.77 | 37.94 | 0.12 |
| C. Ex. 3 | 0.79 | 16.13 | 49.23 | 33.83 | 0.02 |
| C. Ex. 4 | 1.46 | 18.60 | 48.26 | 31.67 | 0.01 |

As is apparent from the above results, the superabsorbent polymers, the surface of which was introduced with the microparticle dispersion solution, were improved in attrition resistance and properties, as in the case where the microparticles were added in powder form.

Typically, a superabsorbent polymer is surface-crosslinked in a manner in which a surface crosslinking agent is dissolved in water and is then mixed with the superabsorbent polymer, thereby inducing uniform distribution and penetration on the surface of the superabsorbent polymer. As such, the use of water may increase the stickiness of the surface of the superabsorbent polymer, undesirably causing agglomeration. Grinding the agglomerated superabsorbent polymer requires a strong force, undesirably damaging the superabsorbent polymer.

The superabsorbent polymers prepared by the addition of the microparticle water dispersion solution in Examples 1 to 3 exhibited similar particle size distribution to the superabsorbent polymer of Comparative Example 1, despite the presence of 2.5% and 5.0% of water. This is because the agglomeration due to water was reduced thanks to the effect of the added microparticles.

The results of dust generation after ball milling are shown in Table 3. In Comparative Example 1 and Examples 1 to 3, the dust generation was reduced by the addition of the microparticle dispersion solution. The surface of the superabsorbent polymer was coated with microparticles and 2.5% or 5% of water was positioned therein, thus increasing attrition resistance, thereby reducing the generation of dust. Furthermore, the dust generation was reduced with an increase in the amounts of the microparticles and water.

Examples 1, 2 and 3 using the microparticle dispersion solution were compared with Comparative Examples 2, 3 and 4. Comparative Examples 2 to 4 pertain to the superabsorbent polymers, obtained by stirring the microparticles in powder form, together with superabsorbent polymer, and then adding water thereto. When the microparticles were added in the form of a dispersion solution by being dispersed in water, similar attrition resistance and properties (Tables 2 and 3) and particle size distribution (Table 4) were manifested. Accordingly, even when the microparticles, which are in dispersion solution form, are added to the superabsorbent polymer, the same properties are confirmed to be exhibited.

The invention claimed is:

1. A method of preparing a superabsorbent polymer, comprising:
adding a hydrous gel polymer, produced by polymerizing a monomer composition comprising a water-soluble ethylenic unsaturated monomer and a polymerization initiator, with a water dispersion solution containing particles having i) a BET specific surface area of 300 to 1500 $m^2/g$ and ii) a porosity of 50% or more, and
wherein the particles have superhydrophobicity with a water contact angle of 145° or more.

2. The method of claim 1, wherein the particles have a particle size ranging from 2 nm to 50 μm.

3. The method of claim 1, wherein the water dispersion solution comprises the particles, water, and an organic solvent.

4. The method of claim 3, wherein the organic solvent is at least one selected from the group consisting of methanol, ethanol, isopropyl alcohol (IPA), and acetone.

5. The method of claim 3, wherein the organic solvent is isopropyl alcohol (IPA).

6. The method of claim 1, wherein the particles are at least one selected from the group consisting of silica ($SiO_2$), alumina, carbon, and titania ($TiO_2$).

7. The method of claim 1, wherein the particles are silica ($SiO_2$).

8. The method of claim 1, wherein the particles have a BET specific surface area of 500 to 1500 $m^2/g$.

9. The method of claim 1, wherein the particles have a porosity of 90% or more.

10. The method of claim 1, wherein the particles are used in an amount of 1 to 25 parts by weight based on 100 parts by weight of the water and organic solvent.

11. The method of claim 1, further comprising drying the hydrous gel polymer produced by the polymerizing.

12. The method of claim 11, further comprising grinding the dried hydrous gel polymer, after the drying.

13. The method of claim 12, further comprising adding a surface crosslinking agent to the ground hydrous gel polymer so that surface crosslinking is carried out and then adding the water dispersion solution containing particles.

14. The method of claim 12, further comprising adding the water dispersion solution containing particles to the ground hydrous gel polymer and then adding a surface crosslinking agent so that surface crosslinking is carried out.

15. The method of claim 13, wherein the surface crosslinking agent is any one or more selected from the group consisting of a polyhydric alcohol compound, an epoxy compound, a polyamine compound, a haloepoxy compound, a haloepoxy compound condensed product, an oxazoline compound, a mono-, di- or poly-oxazolidinone compound, a cyclic urea compound, a polyhydric metal salt, and an alkylene carbonate compound.

16. The method of claim 13, further comprising grinding the superabsorbent polymer to a particle size ranging from 150 to 850 μm, after the surface crosslinking.

17. The method of claim 1, wherein the polymerizing is performed through thermal polymerization or photopolymerization.

18. The method of claim 14, wherein the surface crosslinking agent is any one or more selected from the group consisting of a polyhydric alcohol compound, an epoxy compound, a polyamine compound, a haloepoxy compound, a haloepoxy compound condensed product, an oxazoline compound, a mono-, di- or poly-oxazolidinone compound, a cyclic urea compound, a polyhydric metal salt, and an alkylene carbonate compound.

19. The method of claim 14, further comprising grinding the superabsorbent polymer to a particle size ranging from 150 to 850 μm, after the surface crosslinking.

\* \* \* \* \*